US012607223B2

(12) United States Patent
Hill

(10) Patent No.: US 12,607,223 B2
(45) Date of Patent: Apr. 21, 2026

(54) ACTUATOR LOCKING SYSTEM AND METHOD

(71) Applicant: VIRGIN GALACTIC HOLDINGS, INC., Tustin, CA (US)

(72) Inventor: Edward George Hill, Riverside, CA (US)

(73) Assignee: VIRGIN GALACTIC HOLDINGS, INC., Tustin, CA (US)

( * ) Notice: Subject to any disclaimer, the term of this patent is extended or adjusted under 35 U.S.C. 154(b) by 343 days.

(21) Appl. No.: 18/438,112

(22) Filed: Feb. 9, 2024

(65) Prior Publication Data

US 2025/0257760 A1     Aug. 14, 2025

(51) Int. Cl.
*F16C 11/12*          (2006.01)
*F16C 11/10*          (2006.01)

(52) U.S. Cl.
CPC ............ *F16C 11/103* (2013.01); *F16C 11/12* (2013.01); *F16C 2226/16* (2013.01); *F16C 2229/00* (2013.01)

(58) Field of Classification Search
CPC .... F16C 11/103; F16C 11/12; F16C 2226/16; F16C 2229/00; B64C 13/24; B64C 13/28; B64C 11/32; B64C 11/325; B64G 1/62; B64G 1/623
See application file for complete search history.

(56) References Cited

U.S. PATENT DOCUMENTS

| | | | | | |
|---|---|---|---|---|---|
| 3,611,828 | A | * | 10/1971 | Maroshick .............. | B64C 13/24 |
| | | | | | 74/483 R |
| 4,842,109 | A | * | 6/1989 | Avny ...................... | F16D 41/12 |
| | | | | | 192/223.1 |
| 6,109,415 | A | * | 8/2000 | Morgan .................. | B64C 13/28 |
| | | | | | 192/223.1 |
| 6,122,984 | A | * | 9/2000 | Willmot .................. | F03D 15/00 |
| | | | | | 74/665 GC |
| 6,726,147 | B1 | * | 4/2004 | Perini ..................... | F42B 10/64 |
| | | | | | 244/3.28 |
| 12,391,366 | B1 | * | 8/2025 | Wendell .................. | B64C 13/28 |
| 2003/0100398 | A1 | * | 5/2003 | McKay .................. | B64C 13/341 |
| | | | | | 475/263 |
| 2019/0016441 | A1 | * | 1/2019 | Schank ................... | B64C 11/32 |
| 2019/0063574 | A1 | * | 2/2019 | Kopp ........................ | F16H 1/46 |

(Continued)

*Primary Examiner* — Daniel J Wiley

(74) *Attorney, Agent, or Firm* — Sheppard, Mullin, Richter & Hampton LLP

(57) ABSTRACT

Examples of the disclosed technology provide actuator locking systems and methods with enhanced reliability. The disclosed systems and methods facilitate a compact design that can improve safety and machine life for machines that implement them. Moreover, the systems and methods can be utilized in various types of machines, including spacecraft, aircraft, and other machines that adapt to different structural configurations for different operational scenarios (including different operational environments). To achieve a compact, reliable design, examples utilize a series of specially designed cuffs arranged along a shaft. Namely, an actuator locking system of the presently disclosed technology may comprise: (1) a primary link cuff; (2) a secondary link cuff; and (3) a drive link cuff. The cuffs can be arranged along a shaft with the secondary link cuff positioned between the primary link cuff and the drive link cuff.

20 Claims, 8 Drawing Sheets

(56) References Cited

U.S. PATENT DOCUMENTS

| | | | |
|---|---|---|---|
| 2019/0193835 A1* | 6/2019 | Sandberg | B64C 27/68 |
| 2020/0017193 A1* | 1/2020 | Grimminger | B64C 9/02 |
| 2020/0377196 A1* | 12/2020 | Bassett | F16D 63/006 |
| 2020/0385110 A1* | 12/2020 | Groninga | F16H 1/28 |
| 2021/0047031 A1* | 2/2021 | Hayashida | B64C 27/06 |
| 2021/0101673 A1* | 4/2021 | Faure | F16D 7/027 |
| 2021/0114714 A1* | 4/2021 | Tsai | B64C 9/06 |
| 2021/0114721 A1* | 4/2021 | Cravener | B64C 11/325 |
| 2021/0380225 A1* | 12/2021 | Popov | B64C 13/40 |
| 2021/0380226 A1* | 12/2021 | Popov | B64C 9/00 |
| 2021/0403144 A1* | 12/2021 | Tsai | B64C 9/16 |
| 2022/0380038 A1* | 12/2022 | Ramezani | B64C 33/02 |
| 2023/0062157 A1* | 3/2023 | Yasui | F16C 7/026 |
| 2023/0150652 A1* | 5/2023 | Harrison | B64C 13/34 |
| | | | 244/99.2 |
| 2023/0151845 A1* | 5/2023 | Halcom | F16C 7/06 |
| | | | 74/586 |
| 2023/0192273 A1* | 6/2023 | Balsiger | B64C 13/30 |
| | | | 91/509 |
| 2023/0322364 A1* | 10/2023 | Ungar | F16D 59/00 |
| | | | 244/99.2 |
| 2024/0218800 A1* | 7/2024 | Perdrigeon | B64C 11/32 |
| 2024/0270372 A1* | 8/2024 | John | B64D 45/0005 |
| 2025/0010977 A1* | 1/2025 | Hollands | B64C 13/28 |
| 2025/0010979 A1* | 1/2025 | Hollands | B64C 13/28 |

* cited by examiner

100

204

104(b)

106(a) — 150

130

106(b)

202

104(a)

102(a)

206

102(b)

206

100

150

106(a)

106(a)(i)

106(a)(i)(F)

106(a)(i)

106(a)(ii)

106(a)

106(a)(i)(R)

104(a)(i)(B)

104(a)

104(a)(i)

106(a)(i)(S)

104(a)(i)

102(a)(i)

102(a)

102(a)(ii)

130

ACTUATOR LOCKING SYSTEM AND METHOD

BACKGROUND

Certain machines can adapt to different structural configurations for different operational scenarios. For example, a spacecraft may comprise a feathering system that folds flight control surfaces (e.g., wings, rudders, or other spacecraft surfaces that control flight) of a spacecraft upwards during reentry into Earth's atmosphere. Feathering gives the spacecraft a unique capability to change its shape in space to ensure a safe, flight proven, aerodynamically controlled re-entry into the Earth's atmosphere on a repeated basis.

For example, once a rocket motor burn is completed, pilots may extend the feathering system upwards, which results in the aft wing and tail booms rotating upward to approximately a 60-degree vertical orientation. This "feathered" configuration provides stability during re-entry to the Earth's atmosphere. Namely, the spacecraft acts like a shuttlecock or birdie, orienting the spacecraft to a proper re-entry attitude. The orientation creates high drag, which slows the spaceflight down quickly while high in the atmosphere. This orientation also allows thermal loads generated from re-entering the atmosphere to spread evenly over the surface area of the spaceflight rather than concentrating on a few small points. Once the spaceflight has re-entered the atmosphere, the feather system is rotated back down, returning the flight control surfaces to their original (downwards) position. This allows the pilots to glide the spacecraft smoothly to Earth for a runway landing.

BRIEF DESCRIPTION OF THE DRAWINGS

The present disclosure, in accordance with one or more various examples, is described in detail with reference to the following figures. The figures are provided for purposes of illustration only and merely depict examples.

Figure 1:
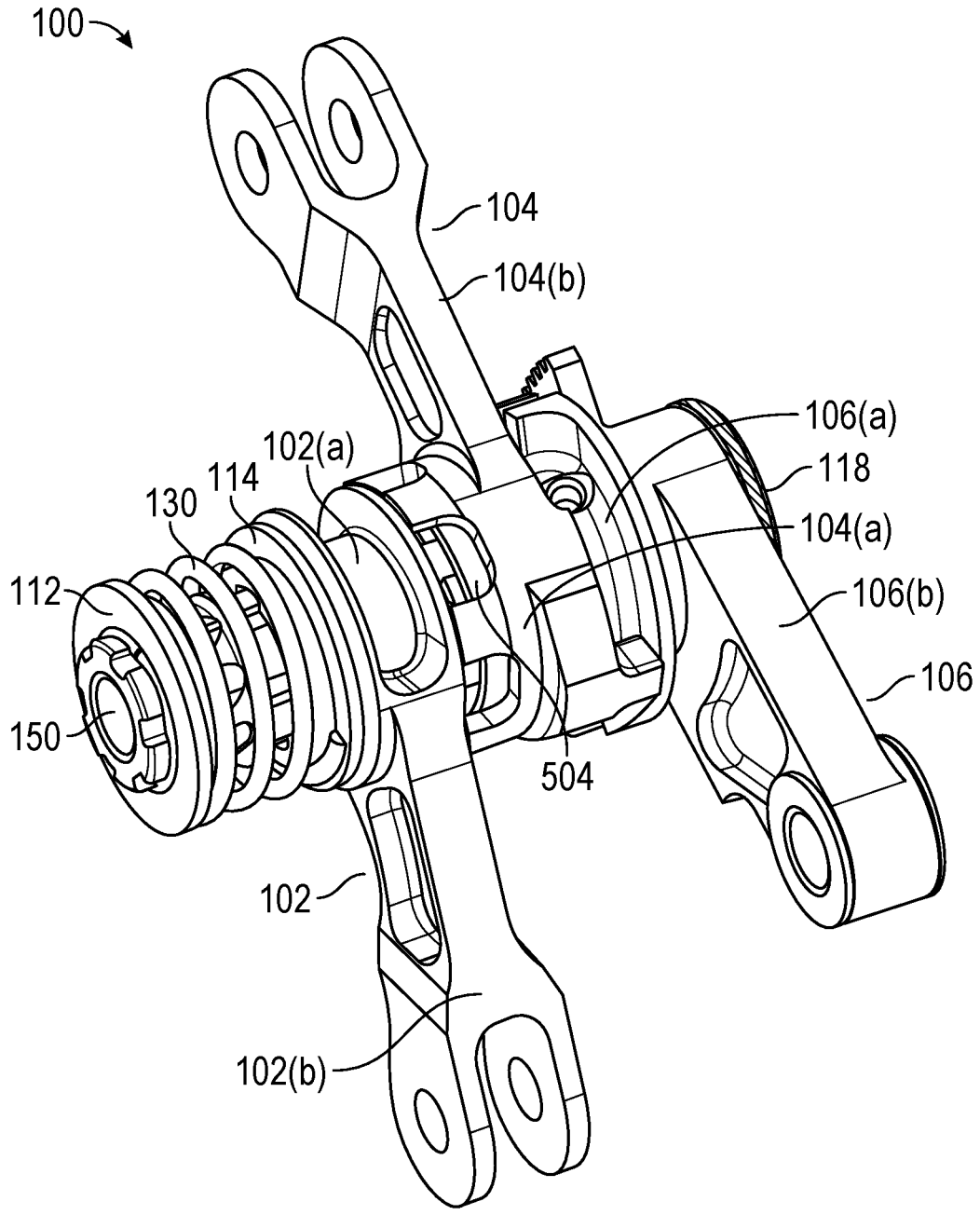
FIG. 1 illustrates a perspective view of an actuator locking system, in accordance with various examples of the presently disclosed technology.

The figures are not exhaustive and do not limit the present disclosure to the precise form disclosed.

DETAILED DESCRIPTION

As alluded to above, certain machines can adapt to different structural configurations for different operational scenarios. For example (and as described above), a spacecraft or other aircraft may comprise a feathering system that actuates flight control surfaces into different desired configurations for different phases of operation. Machines other than spacecraft and aircraft may similarly actuate various structures to adapt those machines to different structural configurations as desired for various operational scenarios (including different operating environments).

Many of the above-described machines include actuator locking systems that "lock" (or otherwise provide structural reinforcement to fix) structural components of their respective machines into the different structural configurations. For example, a machine may comprise an actuator locking system that locks structural components of the machine into a first structural configuration for a first operational scenario. During (or in advance of entering) a second operational scenario, the actuator locking system can unlock the structural components of the machine so they can be moved/adapted to a second structural configuration.

For the above-described machines, reliable operation of actuator locking systems can be important for maintaining safety and improving machine life.

For example, the above-referenced feathering system of a spacecraft may include an actuator locking system that locks the flight control surfaces of the spacecraft in an upwards/folded position in a "feathered" configuration during high-speed reentry into Earth's atmosphere. In this example, the actuator locking system can provide additional structural reinforcement to brace the flight control surfaces of the spacecraft in the upwards/folded position against significant aerodynamic forces. When it is appropriate to lower the flight control surfaces of the spacecraft into an "un-feathered" configuration for winged-flight (e.g., when the spacecraft has slowed to a safe speed and the atmosphere has thickened sufficiently to facilitate steering during winged-flight), the actuator locking system can unlock the flight control surfaces of the spacecraft to allow for such a transition.

As alluded to above, reliable operation for such an actuator locking system can help improve safety and machine life. For example, if the actuator locking system cannot lock the flight control surfaces of the spacecraft in an upwards/folded position as designed, the spacecraft may struggle to maintain a feathered configuration during reentry to the Earth's atmosphere. Accordingly, the spacecraft may not have proper orientation during this high-speed reentry, which can result in reduced spacecraft stability and overheating for certain components of the spacecraft. A more concerning failure could involve the actuator locking system's inability to unlock the flight control surfaces of the spacecraft to transition the spacecraft from the feathered configuration to the un-feathered configuration. If this were to occur, it could be more difficult to steer the spacecraft to a smooth runway landing.

Depending on the specific machine/actuator locking system, various types of failures could result in compromised operation of an actuator locking system. For example, the above-referenced actuator locking system for a spacecraft may rely on pneumatic or hydraulic actuators (e.g., pneumatic or hydraulic cylinders). A mechanical failure for a pneumatic/hydraulic actuator (e.g., piston seizure) could prevent the actuator locking system from locking or unlocking as designed. As another example, a rupture to a pneumatic/hydraulic line could result in loss of pressure that prevents proper operation of the actuator locking system.

Against this backdrop, examples of the presently disclosed technology provide actuator locking systems and methods with enhanced reliability. The disclosed systems and methods facilitate a compact design that can improve safety and machine life for machines that implement them. Moreover, the systems and methods can be utilized in various types of machines, including spacecraft, aircraft, and other machines that adapt to different structural configurations for different operational scenarios (including different operational environments).

To realize more reliable actuator locking systems and methods, examples utilize a series of specially designed cuffs arranged along a shaft. Namely, an actuator locking system of the presently disclosed technology may comprise: (1) a primary link cuff; (2) a secondary link cuff; and (3) a drive link cuff. The cuffs can be arranged along a shaft with the secondary link cuff positioned between the primary link cuff and the drive link cuff.

The primary link cuff may be a structural element of a larger primary link comprising a primary link arm and the primary link cuff at a distal end of the primary link arm. A primary actuator (e.g., a primary pneumatic or hydraulic cylinder) can apply linear force to the primary link arm causing the primary link cuff to rotate about the shaft. Relatedly, the secondary link cuff may be a structural element of a larger secondary link comprising a secondary link arm and the secondary link cuff at a distal end of the secondary link arm. A secondary actuator (e.g., a secondary pneumatic or hydraulic cylinder) can apply linear force to the secondary link arm causing the secondary link cuff to rotate about the shaft. The drive link cuff may comprise a structural element of a larger drive link comprising a drive link arm and the drive link cuff at a distal end of the drive link arm. Rotation of the drive link cuff about the shaft causes the drive link arm to move/rotate.

Movement/rotation of the drive link arm can actuate (either directly or via one or more mechanical linkages) a lock of the actuator locking system. In other words, movement/rotation of the drive link arm can: (1) lock one or more structural components of a machine into a first structural configuration; and (2) unlock the one or more structural components to facilitate transition to a second structural configuration. For example, where the actuator locking system is implemented in a feathering system of a spacecraft, movement/rotation of the drive link arm from a first position to a second position may cause flight control surfaces of the spacecraft to lock into an upwards/folded (i.e., feathered) configuration for reentry into Earth's atmosphere. Relatedly, movement/rotation of the drive link arm from the second position to the first position may cause the flight control surfaces of the spacecraft to unlock, thus allowing the flight control surfaces to be lowered into an un-feathered configuration for winged-flight.

During normal operation, the primary link cuff may interlock with the drive link cuff such that rotational force applied by the primary link cuff to the drive link cuff causes the drive link cuff to rotate about the shaft. Accordingly, the primary actuator which controls rotation of the primary link cuff controls movement/rotation of the drive link arm—and thus controls locking/unlocking for the actuator locking system. By contrast, the secondary link cuff may be non-interlocked with the primary link cuff and the drive link cuff during normal operation. Accordingly, the (interlocked) primary link cuff and drive link cuff can rotate independently from the secondary link cuff.

However, if there is a failure involving the primary actuator (e.g., a piston seizure, loss of pressure on a pneumatic/hydraulic line that supplies the primary actuator, etc.), secondary actuator-initiated rotation of the secondary link cuff about the shaft in a first rotational direction causes the secondary link cuff to push the primary link cuff along the shaft away from the drive link cuff to un-interlock the primary link cuff from the drive link cuff. Accordingly, the secondary actuator can decouple the (disabled/failed) primary actuator from control of locking/unlocking for the actuator locking system. Moreover, secondary actuator-initiated further rotation of the secondary link cuff about the shaft in the first rotational direction causes the secondary link cuff to interlock with the drive link cuff. With the secondary link cuff and drive link cuff now interlocked (and non-interlocked with the primary link cuff), the secondary actuator can now control movement/rotation of the drive link arm—and thus control locking/unlocking of the actuator locking system.

To realize the above-described redundancy functionality, the primary link cuff, the secondary link cuff, and the drive link cuff may comprise strategic structural design features.

For example, the drive link cuff may comprise a raised shoulder (e.g., a structure analogous to a flange) at least partially encircling the shaft. A secondary link cuff-facing surface of the raised shoulder may comprise: (a) a flat portion that maintains an approximately constant distance from the primary link cuff; (b) a ramp rising from, and following the flat portion in the first rotational direction; and (c) a slot following a top of the ramp in the first rotational direction. The ramp may rise a distance (X) towards the primary link cuff along the shaft, where the distance (X) is defined parallel to the shaft. The slot may recess inwards away from the primary link cuff along the shaft. In certain implementations the slot may immediately follow the top of the ramp in the first rotational direction. However, in other implementations the secondary link cuff-facing surface of the raised shoulder may further comprise a top-of-ramp flat portion that immediately follows the top of the ramp in the first rotational direction. Here, the top-of-ramp flat portion may be the distance (X) closer to the primary link cuff than the (lower) flat portion. The slot may immediately follow the top-of-ramp flat portion in the first rotational direction. In other words, the slot may recess inwards from the top-of-ramp flat portion.

Corresponding to the raised shoulder of the drive link cuff, the secondary link cuff may comprise a tooth extending parallel to the shaft and away from the primary link cuff (i.e., towards the drive link cuff). The tooth (or more particularly, a distal end of the tooth) may slide along the secondary link cuff-facing surface of the raised shoulder of the drive link cuff as the secondary link cuff and drive link cuff rotate relative to each other about the shaft. During normal operation, the tooth may slide along the flat portion of the secondary link cuff-facing surface of the raised shoulder as the secondary link cuff and drive link cuff rotate relative to each other. With the tooth only sliding along the flat portion, the secondary link cuff should not linearly articulate along the shaft away from the drive link cuff (and towards the primary link cuff).

However, and as disclosed above, if there is a failure involving the primary actuator, secondary actuator-initiated rotation of the secondary link cuff about the shaft in the first rotational direction can cause the tooth of the secondary link cuff to slide up the ramp of the drive link cuff as the secondary link cuff and drive link cuff rotate relative to each other about the shaft. Sliding of the tooth up the ramp causes the secondary link cuff to linearly articulate along the shaft away from the drive link cuff and towards the primary link cuff. As the secondary link cuff linearly articulates, the secondary link cuff pushes the primary link cuff along the shaft away from the drive link cuff. As described in greater detail below, this pushing of the primary link cuff away from the drive link cuff causes the primary link cuff to un-interlock from the drive link cuff. Accordingly, the (disabled/failed) primary actuator may be effectively decoupled from control of locking/unlocking for the actuator locking system.

As disclosed above, after the tooth of the secondary link cuff has risen up the ramp of the drive link cuff, further rotation of the secondary link cuff in the first rotational direction causes the tooth to slide into the slot, thus interlocking the secondary link cuff with the drive link cuff. With the secondary link cuff and drive link cuff interlocked (and un-interlocked from with primary link cuff), the secondary actuator can now control movement/rotation of the drive link arm—and thus control locking/unlocking for the actuator locking system.

In some implementations, the ramp and slot features may be duplicated approximately 180 degrees away on the secondary link cuff-facing surface of the raised shoulder of the drive link cuff. Correspondingly, the tooth feature may be duplicated approximately 180 degrees away on the secondary link cuff. Accordingly, the secondary actuator-initiated rotation of the secondary link cuff about the shaft in the first rotational direction can cause the second tooth of the secondary link cuff to slide up the second ramp of the drive link cuff in concert with the (first) tooth of the secondary link cuff sliding up the (first) ramp of the drive link cuff. Relatedly, the secondary actuator-initiated further rotation of the secondary link cuff in the first rotational direction can cause the second tooth to slide into the second slot of the drive link cuff in concert with the (first) tooth sliding into the (first) slot of the drive link cuff, thus interlocking the secondary link cuff with the drive link cuff. Here, duplicating such features of the drive link cuff and the secondary link cuff can improve stability/balance for the secondary link cuff-drive link cuff interface.

In certain implementations, the actuator locking system may further comprise a mechanical device that resists compression (e.g., a pre-load spring, a spring and coil coupling, etc.), arranged along the shaft such that the primary link cuff is positioned between the mechanical device and the secondary link cuff.

Accordingly, the mechanical device may apply linear force to the primary link cuff (either directly or via one or more intermediate structural elements along the shaft) and the secondary link cuff (via the primary link cuff) along the shaft towards the drive link cuff. In other words, the mechanical device may resist linear articulation of the primary link cuff and secondary link cuff along the shaft away from the drive link cuff. Here, addition of the mechanical device can ensure (or at least significantly increase the likelihood) that the tooth of the secondary link cuff enters the slot of the drive link cuff. Relatedly, addition of the mechanical device can decrease the likelihood that the tooth of the secondary link cuff skips over (and does not enter) the slot of the drive link cuff. Namely, the mechanical device applies linear force to the secondary link cuff (via the primary link cuff) that pushes the tooth of the secondary link cuff into the slot after the tooth has risen up the ramp of the drive link cuff. Relatedly, the mechanical device resists the type of linear articulation by the secondary link cuff away from the drive link cuff that could cause the tooth of the secondary link cuff to skip over (or otherwise not enter) the slot of the drive link cuff.

Here, ensuring (or at least significantly increasing the likelihood) that the tooth of the secondary link cuff enters the slot of the drive link cuff improves safety/operation of the actuator locking system. Namely, if the tooth of the secondary link cuff does not enter the slot of the drive link cuff (e.g., if the tooth were to skip over the slot), the secondary link cuff and the drive link cuff may not interlock as designed. During a fail-safe operation where the primary link cuff is non-interlocked with the drive link cuff, interlocking between the secondary link cuff and the drive link cuff enables the secondary actuator to control locking/unlocking for the actuator locking system. Accordingly, if the secondary link cuff and drive link cuff are also non-interlocked, neither actuator may be able to control locking/unlocking of the actuator locking system. Depending on application, this can be a major concern. For example, if the actuator locking system is implemented in a feathering system of a spacecraft, and neither actuator can unlock the flight control surfaces of the spacecraft to transition the spacecraft from a feathered configuration to an un-feathered configuration, it could be difficult/impossible to steer the spacecraft to a safe landing.

In some implementations, the actuator locking system may further comprise a stopping flange arranged along the shaft such that the primary link cuff is positioned between the stopping flange and the secondary link cuff. In implementations that include both the mechanical device and the stopping flange, the mechanical device and stopping flange may concentrically overlap about the shaft facilitated by an inner radius/diameter for the mechanical device that is wider than an outer radius/diameter of the stopping flange.

Similar to the mechanical device that resists compression, the stopping flange may improve safety/operation for the actuator locking system by preventing the tooth of the secondary link cuff from skipping over (and not entering) the slot of the drive link cuff. Here, placement of the stopping flange along the shaft may correspond with intelligently designed features of the raised shoulder of the drive link cuff to achieve such functionality. For example, and as alluded to above, the ramp of the drive link cuff may rise a distance (X) towards the stopping flange (and the primary link cuff), where the distance (X) is defined parallel to the shaft. The slot may comprise a first slot edge following the ramp in the first rotational direction, and defining an entrance into the slot for the tooth of the secondary link cuff after rising up the ramp. The slot may comprise a second slot edge at an opposite end of the slot in the first rotational direction. Here, the second slot edge may extend a distance (Y) closer to the stopping flange than the first slot edge, where the distance (Y) is also defined parallel to the shaft. The stopping flange may be positioned to prevent the primary link cuff and the secondary link cuff from linearly articulating greater than a distance (X+Y) away from the drive link cuff along the shaft. Accordingly, the stopping flange prevents the secondary link cuff from linearly articulating away from the drive link cuff by a sufficient distance for the tooth of the secondary link cuff to clear the (higher) height of the second slot edge (i.e., (X+Y))—thus preventing the tooth from skipping over the slot.

Referring now to structure of the primary link cuff, in certain implementations the primary link cuff may comprise a raised shoulder (e.g., analogous to a flange) at least partially encircling the shaft. When the secondary link cuff linearly articulates away from the drive link cuff and towards the primary link cuff (i.e., when the tooth of the secondary link cuff slides up the ramp of the drive link cuff), a primary link-facing surface of the secondary link cuff can push against a secondary link-facing surface of the raised shoulder of the primary link cuff causing the primary link cuff to linearly articulate along the shaft away from the drive link cuff, thus un-interlocking the primary link cuff from the drive link cuff.

In certain implementations, the primary link cuff may comprise a ring of castellations at a drive link cuff-facing surface of the primary link cuff. Correspondingly, the drive link cuff may comprise a ring of castellations at a primary link cuff-facing surface of the drive link cuff. Accordingly, the ring of castellations of the primary link cuff may interlock with the ring of castellations of the drive link cuff when the primary link cuff and the drive link cuff are interlocked. By contrast, when the primary link cuff is pushed away from the drive link cuff, the rings of castellations may mechanically disengage from each other, effectuating un-interlocking of the primary link cuff from the drive link cuff. In certain implementations, the ring of castellations of the primary link cuff and the ring of castellations of the drive link cuff may be asymmetrical. In other words, the rings of castellations may only interlock in a single configuration. This can improve safety for the actuator locking system by decreasing the likelihood of accidental re-interlocking/re-engagement of the rings of castellations when there is a failure involving the primary actuator.

Examples of the presently disclosed technology are described in greater detail in conjunction with the following FIGs.

FIG. 1 illustrates a perspective view of an actuator locking system 100, in accordance with various examples of the presently disclosed technology.

As depicted in this example, actuator locking system 100 comprises a primary link 102, a secondary link 104, and a drive link 106 arranged along a shaft 150. Secondary link 104 is positioned between primary link 102 and drive link 106.

As depicted in this example, primary link 102 comprises a primary link arm 102(b) and a primary link cuff 102(a) at a distal end of primary link arm 102(b). Linear force applied to a proximal end of primary link arm 102(b)(e.g., by a primary actuator not pictured) may cause primary link cuff 102(a) to rotate about shaft 150.

As depicted in this example, secondary link 104 comprises a secondary link arm 104(b) and a secondary link cuff 104(a) at a distal end of secondary link arm 104(b). Linear force applied to a proximal end of secondary link arm 104(b)(e.g., by a secondary actuator not pictured) may cause secondary link cuff 104(a) to rotate about shaft 150.

As depicted in this example, drive link 106 comprises a drive link arm 106(b) and a drive link cuff 106(a) at a distal end of drive link arm 106(b). Rotation of drive link cuff 106(a) about shaft 150 causes drive link arm 106(b) to move/rotate. As alluded to above, movement/rotation of drive link arm 106(b) can actuate a lock (either directly or via one or more mechanical linkages) of actuator locking system 100. In other words, movement/rotation of drive link arm 106(b) can: (1) lock, into a first structural configuration, one or more structural components of a machine that actuator locking system 100 is implemented in; and (2) unlock the one or more structural components to facilitate transition to a second structural configuration.

Structural details of primary link cuff 102(a), secondary link cuff 104(a), and drive link cuff 106(a) will be described in greater detail in conjunction with FIGS. 3A-3D.

As depicted, actuator locking system 100 may further comprise a pre-load spring 130 arranged along shaft 150 such that primary link cuff 102(a) is positioned between pre-load spring 130 and secondary link cuff 104(a). While in the specific example of FIG. 1 actuator locking system 100 comprises pre-load spring 130, in other implementations actuator locking system 100 may instead comprise another type of mechanical device that resists compression. For example, actuator locking system 100 may comprise a spring-and-coil coupling in place of pre-load spring 130.

As alluded to above, pre-load spring 130 may apply linear force to primary link cuff 102(a)(either directly or via one or more intermediate structural elements along shaft 150 such as flange 114) and secondary link cuff 104(a)(via primary link cuff 102(a)) along shaft 150 towards drive link cuff 106(a). In other words, pre-load spring 130 may resist linear articulation of primary link cuff 102(a) and secondary link cuff 104(a) along shaft 150 away from drive link cuff 106(a). Here, addition of pre-load spring 130 can ensure (or at least significantly increase the likelihood) that a tooth of secondary link cuff 104(a)(depicted in greater detail in conjunction with FIGS. 3A-3D) enters a slot of drive link cuff 106(a) (also depicted in greater detail in conjunction with FIGS. 3A-3D). Relatedly, the addition of pre-load spring 130 can decrease the likelihood that the tooth of secondary link cuff 104(a) skips over (and does not enter) the slot of drive link cuff 106(a). Namely, pre-load spring 130 applies linear force to secondary link cuff 104(a) (via primary link cuff 102(a)) that pushes the tooth of secondary link cuff 104(a) into the slot of drive link cuff 106(a) after the tooth has risen up a ramp of drive link cuff 106(a) (depicted in greater detail in conjunction with FIGS. 3A-3D). Relatedly, pre-load spring 130 resists the type of linear articulation by secondary link cuff 104(a) away from drive link cuff 106(a) that could cause the tooth of secondary link cuff 104(a) to skip over (or otherwise not enter) the slot of drive link cuff 106(a).

In certain implementations pre-load spring 130 may span between a flange 112 and a flange 114, which are also arranged along shaft 150. Here, flange 114 may be positioned between pre-load spring 130 and primary link cuff 102(a). Flange 114 may linearly articulate in concert with primary link cuff 102(a) along shaft 150. By contrast, flange 112 may maintain a fixed position along shaft 150. Accordingly, pre-load spring 130 may compress and expand between flange 112 and flange 114 as primary link cuff 102(a) and secondary link cuff 104(a) linearly articulate along shaft 150 away from and towards drive link cuff 106(a).

In some implementations actuator locking system 100 may comprise a flange 118 arranged in a fixed position along shaft 150. Flange 118 can prevent/stop drive link cuff 106(a) from linearly articulating away from secondary link cuff 104(a) along shaft 150.

Figure 5:
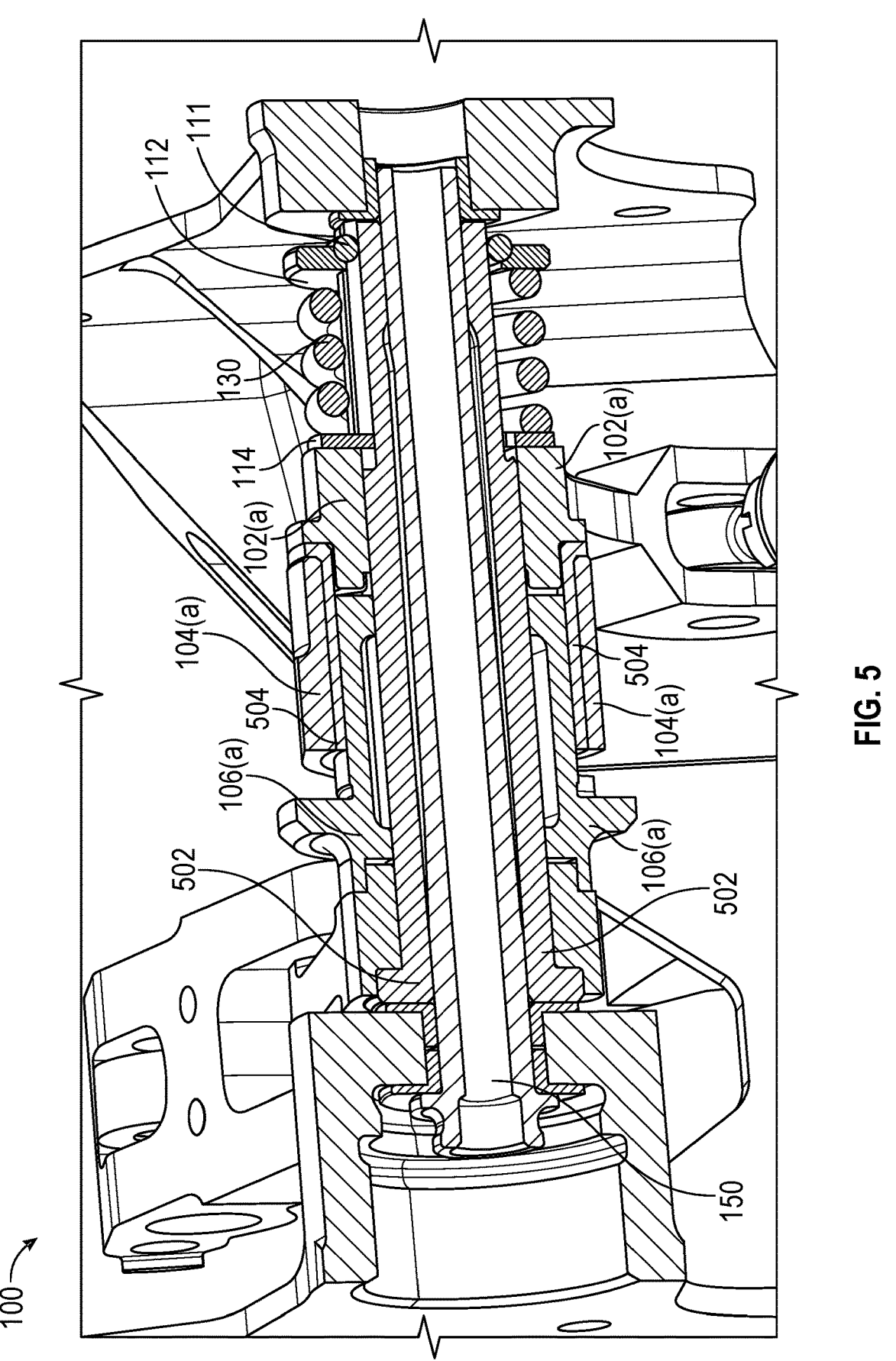
FIG. 5 illustrates a cross-section view of an actuator locking system, in accordance with various examples of the presently disclosed technology.

As depicted in more detail via the example concentric view of FIG. 5, a first portion of secondary link cuff 104(a) can overlap a portion of primary link cuff 102(a) along shaft 150. Relatedly, a second portion of secondary link cuff 104(a) may overlap a portion of drive link cuff 106(a) along the shaft 150. Such overlapping may be facilitated by a wider inner diameter for secondary link cuff 104(a) as compared to the outer diameters of the portion of primary link cuff 102(a) and the portion of drive link cuff 106(a). As depicted, a bearing 504 can radially separate secondary link cuff 104(a) from the portion of primary link cuff 102(a) and the portion of drive link cuff 106(a).

Figure 2:
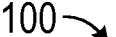
FIG. 2 illustrates another perspective view of an actuator locking system, in accordance with various examples of the presently disclosed technology.

FIG. 2 illustrates another perspective view of actuator locking system 100, in accordance with various examples of the presently disclosed technology.

As depicted, FIG. 2 illustrates a few additional components of actuator locking system 100 that were not illustrated in FIG. 1. Relatedly, certain features/components of actuator locking system 100 which were described in conjunction with FIG. 1 will not be described again here for brevity.

As depicted in FIG. 2, in certain implementations actuator locking system 100 may further comprise a primary actuator 202 and a secondary actuator 204. Primary actuator 202 and secondary actuator 204 may comprise various types of actuators such as pneumatic actuators (e.g., pneumatic cylinders), hydraulic actuators (e.g., hydraulic cylinders), etc. Where primary actuator 202 and secondary actuator 204 comprise pneumatic actuators or hydraulic actuators, each actuator may be supplied from a separate fluid line and a separate fluid reservoir so that a failure associated with one fluid line/fluid reservoir does not impact the other fluid line/fluid reservoir.

As depicted, linear force applied by primary actuator 202 to a proximal end of primary link arm 102(b) can cause primary link cuff 102(a) to rotate about shaft 150 (not directly visible in FIG. 2). Similarly, linear force applied by secondary actuator 204 to a proximal end of secondary link arm 104(b) can cause secondary link cuff 104(a) to rotate about shaft 150.

As depicted, in some implementations actuator locking system 100 may further comprise mechanical linkages 206. Mechanical linkages 206 may comprise one or more mechanical linkages connected to drive link arm 106(b). As depicted, movement/rotation of drive link arm 106(b) can effectuate movement/rotation of mechanical linkages 206. Here, mechanical linkages 206 may actuate a lock/unlock mechanism for actuator locking system 100.

For example, where actuator locking system 100 is implemented in a feathering system of a spacecraft, movement/ rotation of drive link arm 106(b) from a first position to a second position may cause mechanical linkages 206 to move/rotate from a corresponding first position to a corresponding second position. Moving mechanical linkages 206 from the first position to the second position may cause flight control surfaces of the spacecraft to lock into an upwards/ folded (i.e., feathered) configuration for reentry into Earth's atmosphere. Relatedly, movement/rotation of drive link arm 106(b) from the second position to the first position may cause mechanical linkages 206 to move/rotate from the corresponding second position to the corresponding first position. Moving mechanical linkages 206 from the second position to the first position may cause the flight control surfaces of the spacecraft to unlock, thus allowing the flight control surfaces to be lowered into a un-feathered configuration for winged-flight.

As depicted, and as alluded to above, when primary link cuff 102(a) is interlocked with drive link cuff 106(a), primary actuator 202 can control movement/rotation of drive link arm 106(b) and mechanical linkages 206.

However, if there is a failure involving primary actuator 202 (e.g., a piston seizure, loss of pressure on a pneumatic/ hydraulic line that supplies primary actuator 202, etc.), secondary actuator 204-initiated rotation of secondary link cuff 104(a) about shaft 150 in a first rotational direction causes secondary link cuff 104(a) to push primary link cuff 102(a) along shaft 150 away from drive link cuff 106(a) to un-interlock primary link cuff 102(a) from drive link cuff 106(a). Accordingly, secondary actuator 204 can decouple the (disabled/failed) primary actuator 202 from control of locking/unlocking for actuator locking system 100. Moreover, secondary actuator 204-initiated further rotation of secondary link cuff 104(a) about shaft 150 in the first rotational direction causes secondary link cuff 104(a) to interlock with drive link cuff 106(a). With secondary link cuff 104(a) and drive link cuff 106(a) now interlocked (and un-interlocked from primary link cuff 102(a)), secondary actuator 204 can now control movement/rotation of drive link arm 106(b) and mechanical linkages 206—and thus control locking/unlocking of actuator locking system 100.

Structural features for the cuffs that facilitate the above-described fail-safe functionality are described in greater detail in conjunction with FIGS. 3A-3D.

FIGS. 3A-3D illustrative zoomed in views of structural features for actuator locking system 100, in accordance with various examples of the presently disclosed technology.

As depicted, secondary link cuff 104(a) comprises a tooth 104(a)(i) extending away from primary link cuff 102(a) along shaft 150. As alluded to above, tooth 104(a)(i)(or more particularly a distal end of tooth 104(a)(i)) may slide along a secondary link cuff 104(a)-facing surface of a raised shoulder 106(a)(i) of drive link cuff 106(a) as secondary link cuff 104(a) and drive link cuff 106(a) rotate relative to each other.

Referring now to drive link cuff 106(a), drive link cuff 106(a) may comprise raised shoulder 106(a)(i) at least partially encircling shaft 150. The secondary link cuff 104 (a)-facing surface of raised shoulder 106(a)(i) may comprise: (a) a flat portion 106(a)(i)(F) that maintains an approximately constant distance from the primary link cuff 102(a); (b) a ramp 106(a)(i)(R) rising from, and following flat portion 106(a)(i)(F) in a first rotational direction; and (c) a slot 106(a)(i)(S) following a top of ramp 106(a)(i)(R) in the first rotational direction. Ramp 106(a)(i)(R) may rise a distance (X) towards primary link cuff 102(a), where the distance (X) is defined parallel to shaft 150. Slot 106(a)(i)(S) may recess inwards away from primary link cuff 102(a) along shaft 150. As described in greater detail below, slot 106(a)(i)(S) may recess inwards less than the distance (X) to prevent primary link cuff 104(a) and drive link cuff 106(a) from re-interlocking when tooth 104(a)(i) slides into slot 106(a)(i)(S). In other implementations, tooth 104(a)(i) and/ or slot 106(a)(i)(S) may include structural features that prevent tooth 104(a)(i) from recessing inwards as far as the distance (X).

In certain implementations, slot 106(a)(i)(S) may immediately follow the top of ramp 106(a)(i)(R) in the first rotational direction. However, in other implementations the secondary link cuff 104(a)-facing surface of raised shoulder 106(a)(i) may further comprise a top-of-ramp flat portion that immediately follows the top of ramp 106(a)(i)(R) in the first rotational direction. Here, the top-of-ramp flat portion may be the distance (X) closer to primary link cuff 102(a) than flat portion 106(a)(i)(F). Slot 106(a)(i)(S) may immediately follow the top-of-ramp flat portion in the first rotational direction. In other words, slot 106(a)(i)(S) may recess inwards from the top-of-ramp flat portion.

In certain implementations, raised shoulder 106(a)(i) may further comprise a brow 106(a)(i)(B) immediately following slot 106(a)(i)(S) in the first rotational direction. Such a feature is described in greater detail below in conjunction with a second brow 106(a)(i)(B2) depicted in FIG. 3B, which is analogous in form and function to brow 106(a)(i) (B).

Figure 3A:
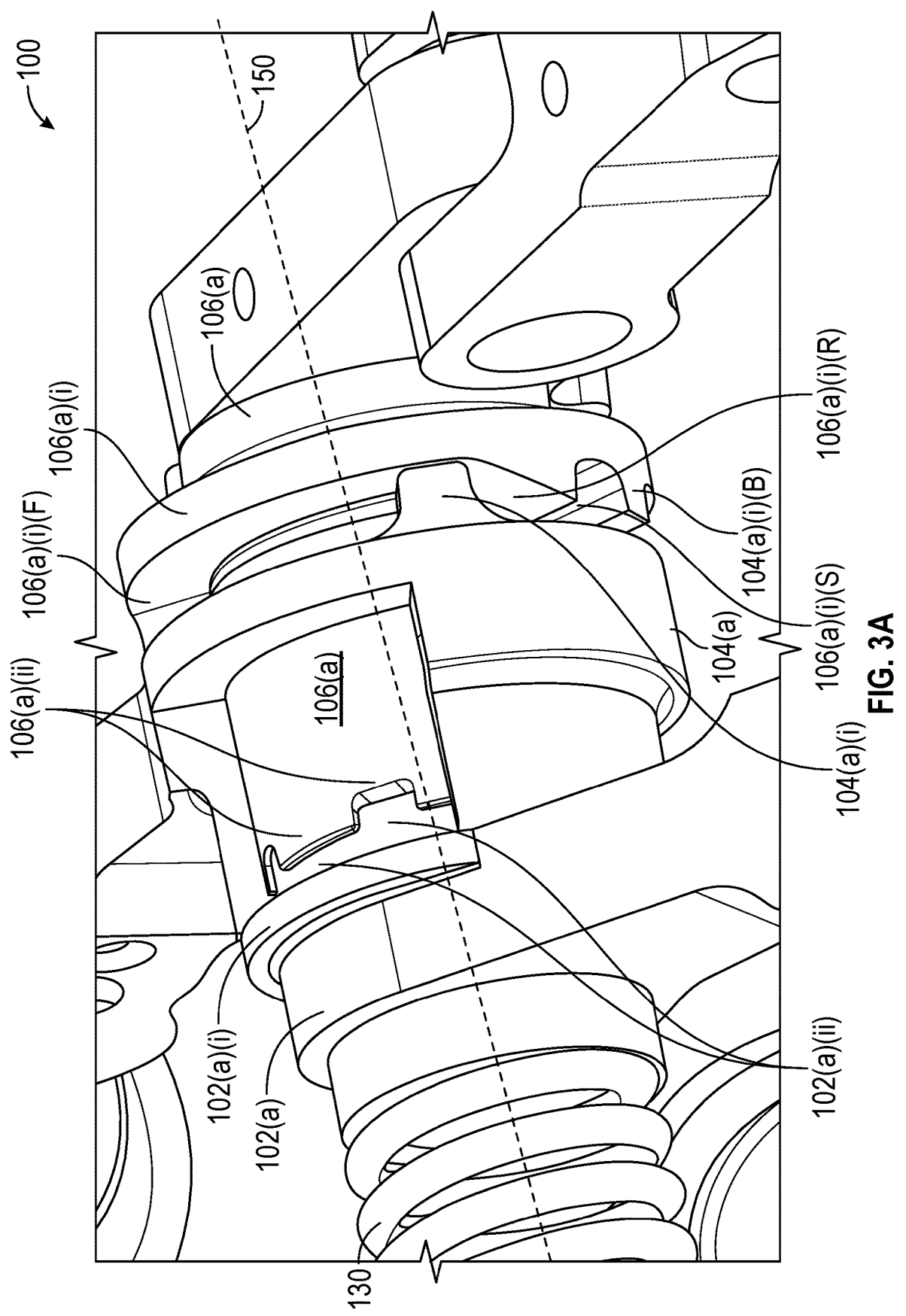
FIGS. 3A-3D illustrate zoomed in views of structural features for an actuator locking system, in accordance with various examples of the presently disclosed technology.
Figure 3B:
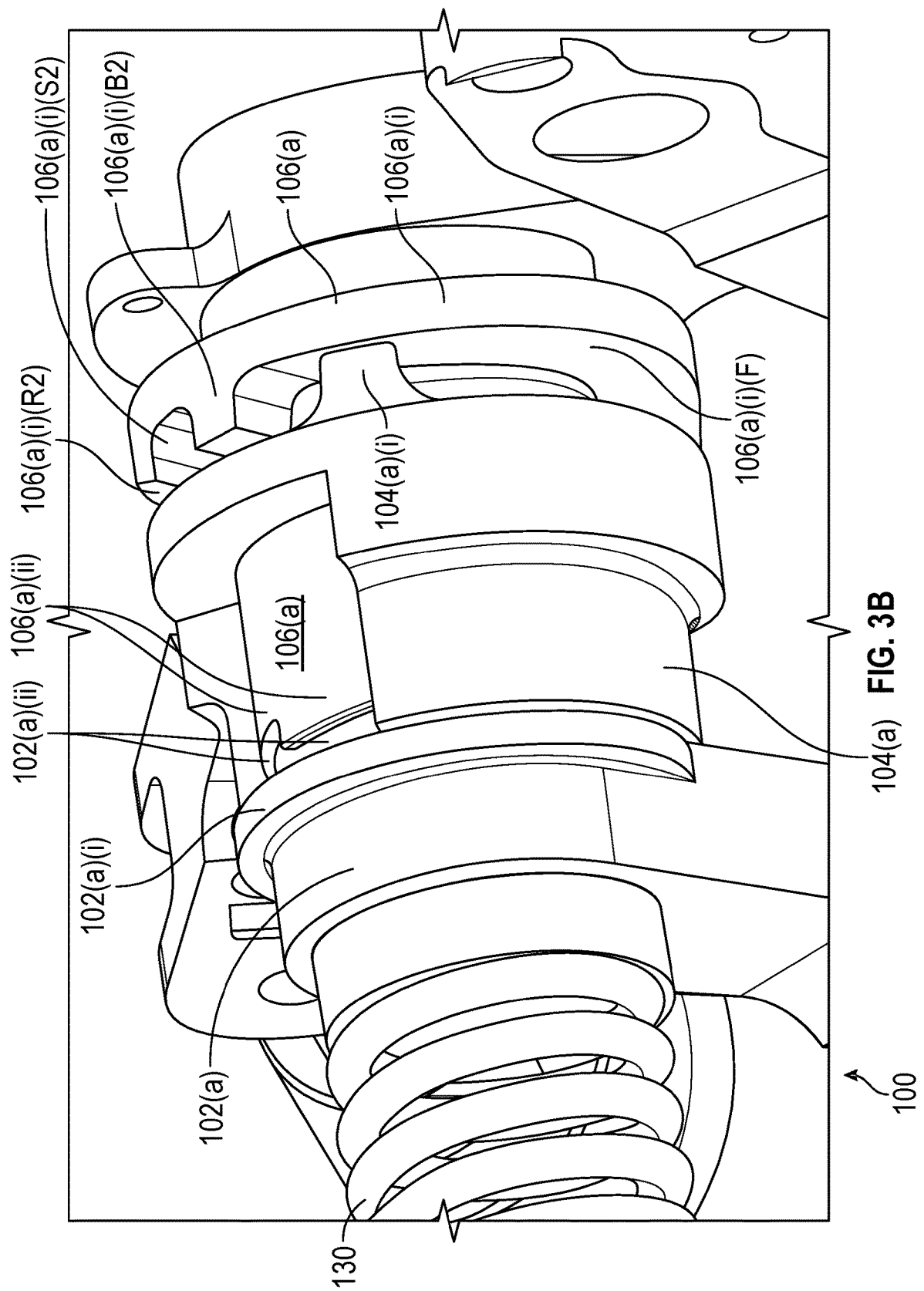

As depicted in FIG. 3B, in certain implementations raised shoulder 106(a)(i) may have duplicative features spaced approximately 180 degrees apart. For example, raised shoulder 106(a)(i) may further comprise: (a) a second flat portion (not depicted), analogous to (first) flat portion 106(a)(i)(F), that maintains an approximately constant distance from the primary link cuff 102(a); (b) a second ramp 106(a)(i)(R2) rising from, and following the second flat portion in the first rotational direction; and (c) a second slot 106(a)(i)(S2) following a top of second ramp 106(a)(i)(R2) in the first rotational direction. Like ramp 106(a)(i)(R), second ramp 106(a)(i)(R2) may rise the distance (X) towards primary link cuff 102(*a*) along shaft 150. Like slot 106(*a*)(*i*)(S), second slot 106(*a*)(*i*)(S) may recess inwards away from primary link cuff 102(*a*) along shaft 150.

Correspondingly, secondary link cuff 104(*a*) may comprise a second tooth (not depicted) analogous to tooth 104(*a*)(*i*). Like the duplicative features of raised shoulder 106(*a*)(*i*), the second tooth may be spaced approximately 180 degrees apart from tooth 104(*a*)(*i*).

As depicted, during normal operation (i.e., when primary link cuff 102(*a*) is interlocked with drive link cuff 106(*a*) and secondary link cuff 104(*a*) is non-interlocked with the other cuffs), tooth 104(*a*)(*i*) may slide along flat portion 106(*a*)(*i*) (F) between ramp 106(*a*)(*i*)(R) in the first rotational direction and second brow 106(*a*)(*i*)(B2) in the second rotational direction. As depicted best in FIG. 3B, second brow 106(*a*) (*i*)(B2) may comprise a steep/sharp incline (e.g., an incline approaching 90 degrees) that defines a boundary for flat portion 106(*a*)(*i*)(F) in the second rotational direction. This steep/sharp incline may prevent tooth 104(*a*)(*i*) from climbing upwards and entering second slot 106(*a*)(*i*)(S2) from the second rotational direction. Accordingly, the steep/sharp incline of second brow 106(*a*)(*i*)(B2) can prevent mistaken un-interlocking of primary link cuff 102(*a*) from drive link cuff 106(*a*) that would be caused by tooth 104(*a*)(*i*) climbing up second brow 106(*a*)(*i*)(B2). Relatedly, the steep/sharp incline of second brow 106(*a*)(*i*)(B2) can prevent mistaken interlocking between secondary link cuff 104(*a*) and drive link cuff 106(*a*) that would be caused by tooth 104(*a*)(*i*) entering second slot 106(*a*)(*i*)(S2) from the second rotational direction.

While not depicted, during normal operation the second tooth of secondary link cuff 104(*a*) may slide along the second flat portion of raised shoulder 106(*a*)(*i*) in the same/similar manner. Namely, the second tooth may slide along the second flat portion between second ramp 106(*a*) (*i*)(R2) in the first rotational direction and brow 106(*a*)(*i*)(B) in the second rotational direction. Analogous to second brow 106(*a*)(*i*)(B2), brow 106(*a*)(*i*)(B1) may comprise a steep/sharp incline (e.g., an include approaching 90 degrees) that defines a boundary for the second flat portion in the second rotational direction. This steep/sharp incline may prevent the second tooth from climbing up and entering slot 106(*a*)(*i*)(S) from the second rotational direction. Accordingly, the steep/sharp incline of brow 106(*a*)(*i*)(B) can prevent mistaken un-interlocking of primary link cuff 102(*a*) from drive link cuff 106(*a*) that would be caused by the second tooth climbing up brow 106(*a*)(*i*)(B1). Relatedly, the steep/sharp incline of brow 106(*a*)(*i*)(B) can prevent mistaken interlocking between secondary link cuff 104(*a*) and drive link cuff 106(*a*) that would be caused by the second tooth entering slot 106(*a*)(*i*)(S) from the second rotational direction.

Referring now to primary link cuff 102(*a*), as depicted primary link cuff 102(*a*) comprises a raised shoulder 102 (*a*)(*i*) at least partially encircling shaft 150. Primary link cuff 102(*a*) also comprises a ring of castellations 102(*a*)(*ii*) at a drive link cuff 106(*a*)-facing surface of primary link cuff 102(*a*). Drive link cuff 106(*a*) comprises a corresponding/reciprocal ring of castellations 106(*a*)(*ii*) at a primary link 102(*a*)-facing surface of drive link cuff 106(*a*). As alluded to above, in certain implementations, ring of castellations 102(*a*)(*ii*) and ring of castellations 106(*a*)(*ii*) may be asymmetrical. In other words, the rings of castellations may only interlock in a single configuration. This can improve safety for actuator locking system 100 by decreasing the likelihood of accidental re-interlocking/re-engagement of the rings of castellations when there is a failure involving primary actuator 202 (not visible in FIGS. 3A-3D).

As depicted in FIGS. 3A-3B, during normal operation ring of castellations 102(*a*)(*ii*) and ring of castellations 106(*a*)(*ii*) may interlock, thus interlocking primary link cuff 102(*a*) with drive link cuff 106(*a*).

Figure 3C:
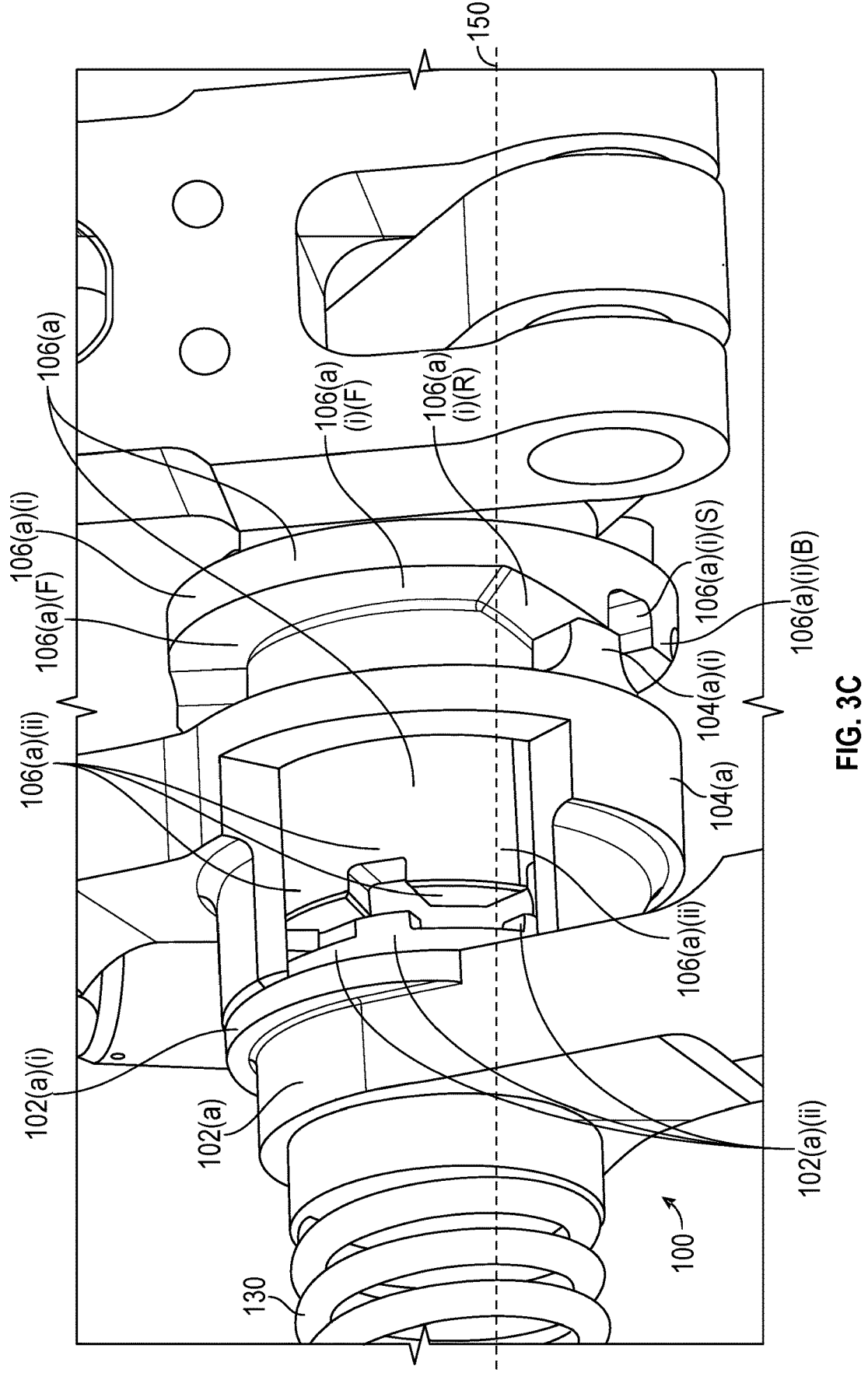

However, as depicted in FIG. 3C, secondary actuator 204-initiated rotation of secondary link cuff 104(*a*) in the first rotational direction can cause tooth 104(*a*)(*i*) to slide up ramp 106(*a*)(*i*)(R). Sliding of tooth 104(*a*)(*i*) up ramp 106 (*a*)(*i*)(R) causes secondary link cuff 104(*a*) to linearly articulate away from drive link cuff 106(*a*) and towards primary link cuff 102(*a*) along shaft 150. Such linear articulation of secondary link cuff 104(*a*) causes a primary link cuff 102 (*a*)-facing surface of secondary link cuff 104(*a*) to push a secondary link cuff 104(*a*)-facing surface of raised shoulder 102(*a*)(*i*) away from drive link cuff 106(*a*) along shaft 150. Such pushing causes primary link cuff 102(*a*) to linearly articulate away from drive link cuff 106(*a*) along shaft 150. As primary link cuff 102(*a*) linearly articulates away from drive link cuff 106(*a*) along shaft 150, ring of castellations 102(*a*)(*ii*) and ring of castellations 106(*a*)(*ii*) may un-interlock (i.e., disengage) from each other. With ring of castellations 102(*a*)(*ii*) and ring of castellations 106(*a*)(*ii*) un-interlocked, primary link cuff 102(*a*) and drive link cuff 106(*a*) may also un-interlock.

Figure 3D:
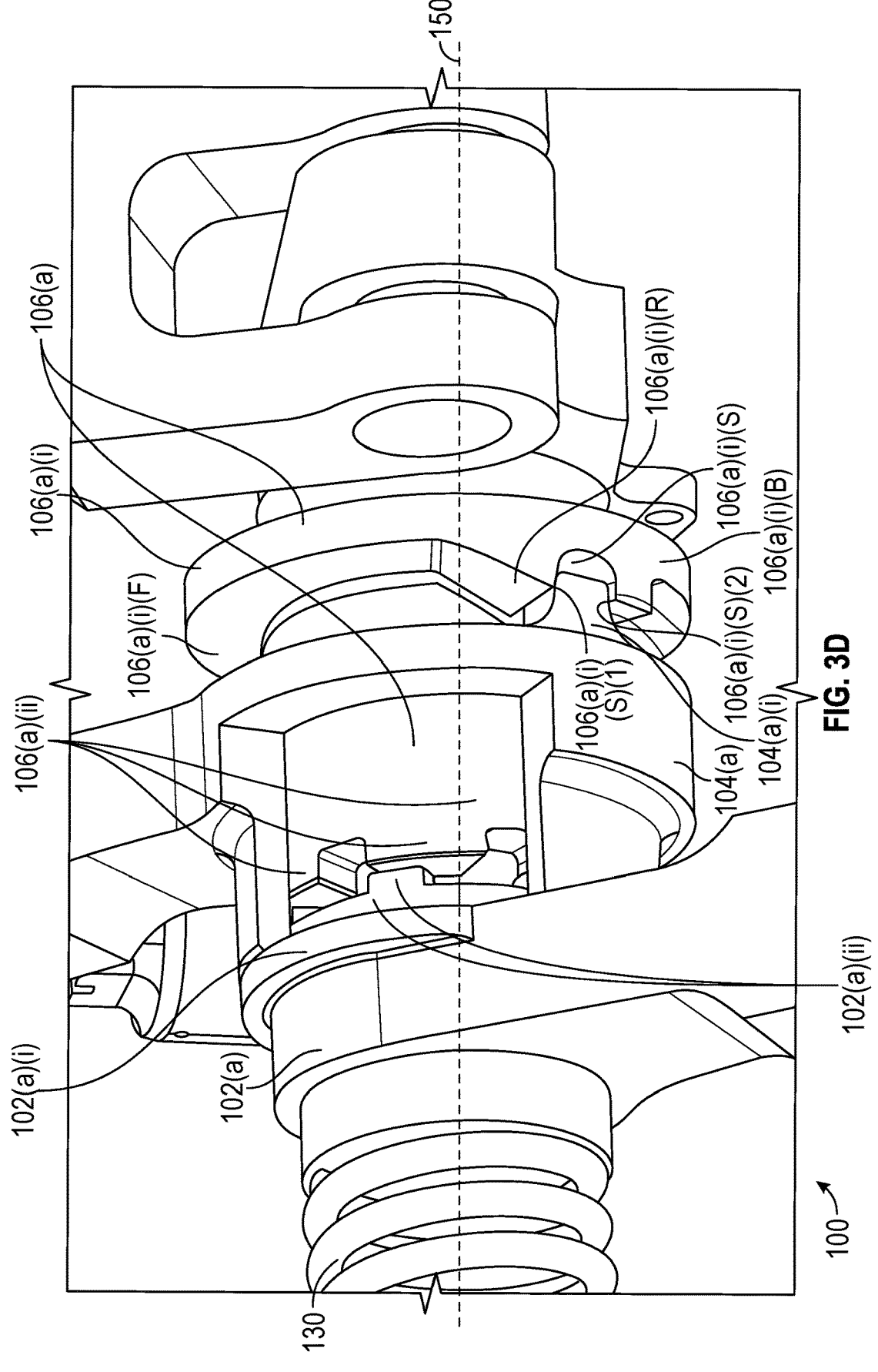

As depicted in FIG. 3D, secondary actuator 204-initiated further rotation of secondary link cuff 104(*a*) in the first rotational direction can cause tooth 104(*a*)(*i*) to enter slot 106(*a*)(*i*)(S) after rising up ramp 106(*a*)(*i*)(R). Linear force applied by pre-load spring 130 can further facilitate tooth 104(*a*)(*i*) entering slot 106(*a*)(*i*)(S) by pushing primary link cuff 102(*a*) and secondary link cuff 104(*a*) towards drive link cuff 106(*a*).

As depicted in FIG. 3D, with tooth 104(*a*)(*i*) interlocked in slot 106(*a*)(*i*)(S), secondary link cuff 104(*a*) and drive link cuff 106(*a*) may be interlocked, while primary link cuff 102(*a*) remains non-interlocked from drive link cuff 106(*a*). Accordingly, secondary actuator 204 (not fully visible in FIGS. 3A-3D) can control rotation of drive link cuff 106(*a*) in lieu of primary actuator 202 (also not fully visible in FIGS. 3A-3D).

As alluded to above, to prevent ring of castellations 102(*a*)(*ii*) and ring of castellations 106(*a*)(*ii*) from re-interlocking when tooth 104(*a*)(*i*) is interlocked in slot 106(*a*) (*i*)(S), slot 106(*a*)(*i*)(S) and/or tooth 104(*a*)(*i*) may be dimensioned to ensure that tooth 104(*a*)(*i*) slides inwards a distance less than the distance (X) that tooth 104(*a*)(*i*) rose up ramp 106(*a*)(*i*)(R).

As depicted in FIG. 3D, slot 106(*a*)(*i*)(S) may comprises a first slot edge slot 106(*a*)(*i*)(S)(1) following ramp 106(*a*) (*i*)(R) in the first rotational direction, and defining an entrance into slot 106(*a*)(*i*)(S) for tooth 104(*a*)(*i*) after rising up ramp 106(*a*)(*i*)(R). Slot 106(*a*)(*i*)(S) may also comprise a second slot edge 106(*a*)(*i*)(S)(2) at an opposite end of slot 106(*a*)(*i*)(S) in the first rotational direction. Here, second slot edge 106(*a*)(*i*)(S)(2) may extend a distance (Y) closer to primary link cuff 102(*a*) than first slot edge 106(*a*)(*i*)(S)(1), where the distance (Y) is also defined parallel to shaft 150. As alluded to above, a stopping flange of actuator locking system 100 (depicted in FIG. 4) may be positioned to prevent primary link cuff 102(*a*) and secondary link cuff 104(*a*) from linearly articulating greater than a distance (X+Y) away from drive link cuff 106(*a*) along shaft 150. Accordingly, the stopping flange can prevent secondary link cuff 104(*a*) from linearly articulating away from drive link cuff 106(*a*) by a sufficient distance for tooth 104(*a*)(*i*) to clear the (higher) height of second slot edge 106(*a*)(*i*)(S)(2)

(i.e., the (X+Y))—thus preventing tooth $104(a)(i)$ from skipping over slot $106(a)(i)(S)$.

Figure 4:
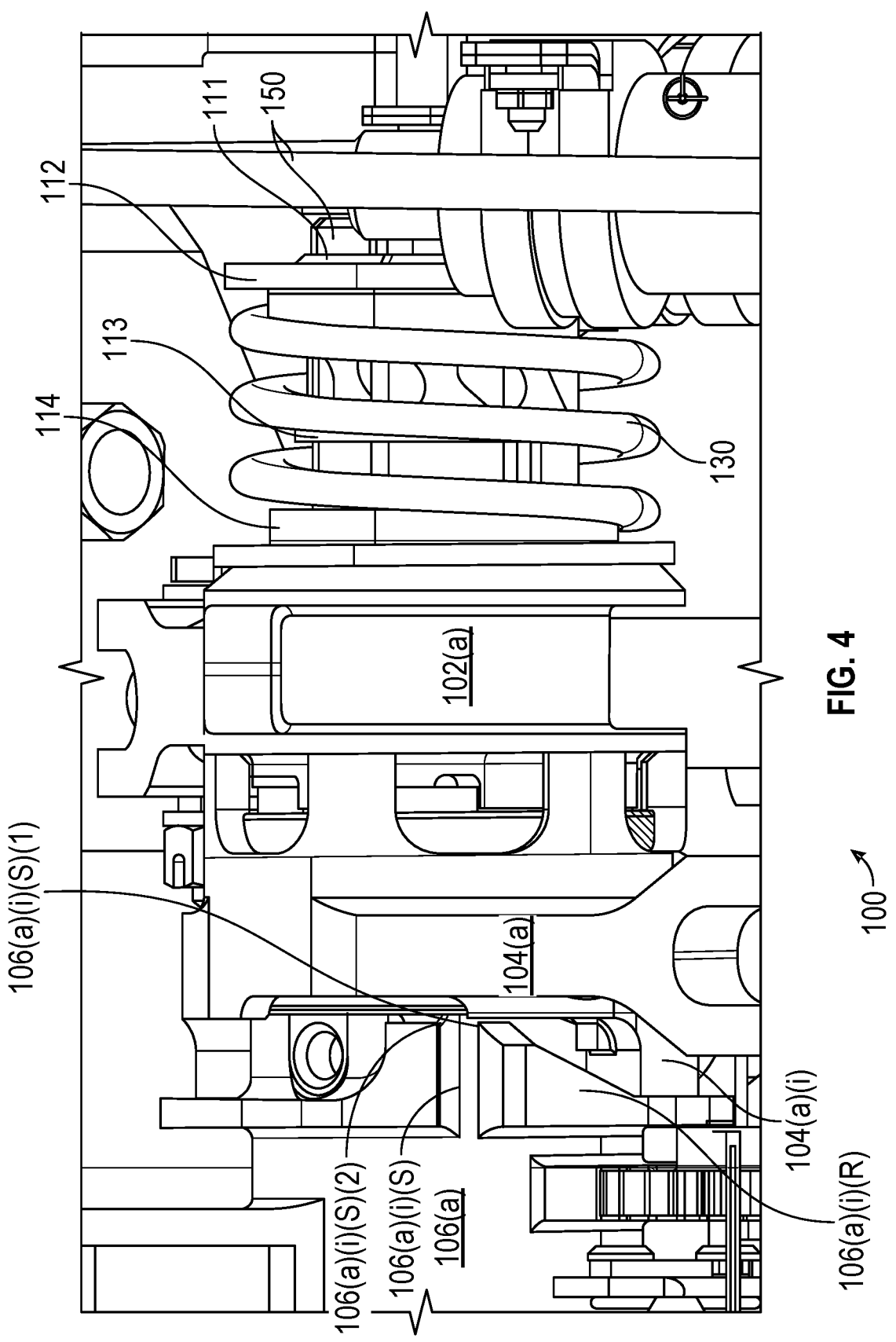
FIG. 4 illustrates another zoomed in view of structural features for an actuator locking system, in accordance with various examples of the presently disclosed technology

FIG. 4 illustrates another zoomed in view of structural features of actuator locking system 100, in accordance with various examples of the presently disclosed technology As depicted, FIG. 4 illustrates a few components of actuator locking system 100 not directly illustrated in the previous FIGs. Relatedly, certain features/components of actuator locking system 100 which were described in conjunction with the previous FIGs. will not be described again here for brevity.

As depicted, in certain implementations actuator locking system 100 may further comprise a stopping flange 113 positioned between flange 114 and flange 112 along shaft 150. In some implementations, actuator locking system 100 may also further comprise a retainer 111 that holds flange 112 in a fixed position along shaft 150.

Like flange 112, stopping flange 113 may maintain a fixed position along shaft 150. As depicted, in certain implementations stopping flange 113 and flange 112 may be mechanically connected as part of a common structure that maintains a fixed position along shaft 150.

As depicted, and as described in conjunction with FIG. 1, pre-load spring 130 may span flange 112 and 114. In certain implementations, a first end of pre-load spring 130 may be mechanically connected to flange 112 and a second end of pre-load spring 130 may be mechanically connected flange 114.

As described in conjunction with FIG. 1, flange 114 may linearly articulate along shaft 150 in concert with primary link cuff 102($a$) and secondary link cuff 104($a$). Accordingly, as primary link cuff 102($a$) and secondary link cuff 104($a$) linearly articulate towards and away from drive link cuff 106($a$), pre-load spring 130 may expand and compress as flange 114 moves relative to flange 112.

As depicted, stopping flange 113 may have a smaller outer diameter than pre-load spring 130's inner diameter. Accordingly, pre-load spring 130 can concentrically overlap stopping flange 113 in a radial direction from shaft 150. Thus, stopping flange 113 may not obstruct pre-load spring 130 as pre-load spring 130 expands and compresses.

Because stopping flange 113 maintains a fixed position along shaft 150, a flange 114-facing surface of stopping flange 113 can stop/prevent flange 114 from continuing to linearly articulate towards flange 112. In this way, the flange 114-facing surface of stopping flange 113 can stop/prevent primary link cuff 102($a$) and secondary link cuff 104($a$) from continuing to linearly articulate away from drive link cuff 106($a$). In other words, the flange 114-facing surface of stopping flange 113 can set a maximum boundary for linear articulation for primary link cuff 102($a$) and secondary link cuff 104($a$) away from drive link cuff 106($a$).

As alluded to above, similar to pre-load spring 130, stopping flange 113 can improve safety/operation for actuator locking system 100 by preventing tooth 104($a$)($i$) from skipping over (and not entering) slot 106($a$)($i$)(S). Here, placement of stopping flange 113 along shaft 150 may correspond with the staggered heights for first slot edge 106($a$)($i$)(S)(1) and second slot edge 106($a$)($i$)(S)(2).

For example, and as alluded to above, ramp 106($a$)($i$)(R) may rise a distance (X) towards stopping flange 113, where the distance (X) is defined parallel to shaft 150. Second slot edge 106($a$)($i$)(S)(2) may extend a distance (Y) closer to stopping flange 113 than first slot edge 106($a$)($i$)(S)(1), where the distance (Y) is also defined parallel to shaft 150. Accordingly, stopping flange 113 may be positioned to prevent primary link cuff 102($a$) and secondary link cuff

104($a$) from linearly articulating greater than a distance (X+Y) away from drive link cuff 106($a$) along shaft 150. Accordingly, stopping flange 113 prevents secondary link cuff 104($a$) from linearly articulating away from drive link cuff 106($a$) by a sufficient distance for tooth 104($a$)($i$) to clear the (higher) height of second slot edge 106($a$)($i$)(S)(2) (i.e., (X+Y))—thus preventing tooth 104($a$)($i$) from skipping over slot 106($a$)($i$)(S).

FIG. 5 illustrates a cross-section view of actuator locking system 100, in accordance with various examples of the presently disclosed technology.

As depicted, drive link cuff 106($a$), secondary link cuff 104($a$), primary link cuff 102($a$), flange 114, pre-load spring 130, flange 112, and retainer 111 are arranged along (cylindrical) shaft 150.

A bearing 502 may radially separate shaft 150 from drive link cuff 106($a$), primary link cuff 102($a$), flange 114, flange 112, and retainer 111.

As depicted, a first portion of secondary link cuff 104($a$) overlaps a portion of primary link cuff 102($a$) along shaft 150. Relatedly, a second portion of secondary link cuff 104($a$) overlaps a portion of drive link cuff 106($a$) along the shaft 150. Such overlapping may be facilitated by a wider inner diameter for secondary link cuff 104($a$) as compared to the outer diameters of the portion of primary link cuff 102($a$) and the portion of drive link cuff 106($a$). As depicted, a bearing 504 can radially separate secondary link cuff 104($a$) from the portion of primary link cuff 102($a$) and the portion of drive link cuff 106($a$).

It should be understood that the various features, aspects and functionality described in one or more of the individual embodiments are not limited in their applicability to the particular embodiment with which they are described. Instead, they can be applied, alone or in various combinations, to one or more other embodiments, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A system comprising
a primary link cuff;
a secondary link cuff; and
a drive link cuff;
wherein the primary link cuff, the secondary link cuff, and the drive link cuff are arranged along a shaft with the secondary link cuff positioned between the primary link cuff and the drive link cuff such that when the drive link cuff is interlocked with the primary link cuff and non-interlocked with the secondary link cuff:
  rotation of the secondary link cuff about the shaft in a first rotational direction causes the secondary link cuff to push the primary link cuff along the shaft away from the drive link cuff to un-interlock the primary link cuff from the drive link cuff, and
  further rotation of the secondary link cuff about the shaft in the first rotational direction causes the secondary link cuff to interlock with the drive link cuff.

2. The system of claim 1, wherein:
rotational force applied by the primary link cuff to the drive link cuff causes the drive link cuff to rotate about the shaft when the drive link cuff is interlocked with the primary link cuff and non-interlocked with the secondary link cuff; and
rotational force applied by the secondary link cuff to the drive link cuff causes the drive link cuff to rotate about the shaft when the drive link cuff is interlocked with the secondary link cuff and non-interlocked with the primary link cuff.

3. The system of claim 1, further comprising a pre-load spring arranged along the shaft, wherein:
the primary link cuff is positioned between the pre-load spring and the secondary link cuff along the shaft;
the pre-load spring applies linear force to the primary link cuff and the secondary link cuff towards the drive link cuff;
the secondary link cuff comprises a tooth extending away from the primary link cuff along the shaft;
the drive link cuff comprises a raised shoulder at least partially encircling the shaft;
a secondary link cuff-facing surface of the raised shoulder of the drive link cuff comprises:
  a ramp rising towards the primary link cuff, and
  a slot, following in the first rotational direction, an end of the ramp closest to the primary link cuff, wherein the slot recesses inwards away from the primary link cuff along the shaft; and
when the drive link cuff is interlocked with the primary link cuff and non-interlocked with the secondary link cuff:

rotation of the secondary link cuff about the shaft in the first rotational direction causes a distal end of the tooth to slide up the ramp towards the primary link cuff, and
  further rotation of the secondary link cuff about the shaft in the first rotational direction, in combination with the linear force applied by the pre-load spring, causes the distal end of the tooth to slide into the slot, thereby interlocking the secondary link cuff with the drive link cuff.

4. The system of claim 3, wherein:
the primary link cuff comprises a raised shoulder at least partially encircling the shaft;
when the distal end of the tooth of the secondary link cuff slides up the ramp of the raised shoulder of the drive link cuff, the secondary link cuff linearly articulates along the shaft towards the primary link cuff; and
the linear articulation of the secondary link cuff along the shaft towards the primary link cuff causes a primary link cuff-facing surface of the secondary link cuff to push a secondary link cuff-facing surface of the raised shoulder of the primary link cuff away from the drive link cuff, thereby un-interlocking the primary link cuff from the drive link cuff.

5. The system of claim 3, further comprising a stopping flange arranged along the shaft such that the primary link cuff is positioned between the stopping flange and the secondary link cuff along the shaft, wherein:
the slot of the raised shoulder of the drive link cuff comprises:
  a first slot edge that the distal end of the tooth of the secondary link cuff slides over to enter the slot after sliding up the ramp of the raised shoulder of the drive link cuff, the first slot edge positioned at a first end of the slot; and
  a second slot edge positioned at a second end of the slot;
the ramp of the raised shoulder of the drive link cuff rises a distance (X) towards the stopping flange, the distance (X) defined parallel to the shaft;
the second slot edge extends closer to the stopping flange than the first slot edge by a distance (Y), the distance (Y) defined parallel to the shaft; and
the stopping flange prevents the primary link cuff and the secondary link cuff from linearly articulating away from the drive link cuff along the shaft by a distance greater than (X+Y).

6. The system of claim 3, wherein:
a first portion of the secondary link cuff overlaps a portion of the primary link cuff along the shaft;
a second portion of the secondary link cuff overlaps a portion of the drive link cuff along the shaft; and
the system further comprises a bearing arranged along the shaft such that the bearing separates, in a radial direction with respect to the shaft:
  the first portion of the secondary link cuff from the portion of the primary link cuff, and
  the second portion of the secondary link cuff from the portion of the drive link cuff.

7. The system of claim 1, further comprising:
a primary link comprising a primary link arm and the primary link cuff at a distal end of the primary link arm, wherein linear force applied to the primary link arm causes rotation of the primary link cuff about the shaft;
a secondary link comprising a secondary link arm and the secondary link cuff at a distal end of the secondary link arm, wherein linear force applied to the secondary link arm causes rotation of the secondary link cuff about the shaft; and a drive link comprising a drive link arm and the drive link cuff at a distal end of the drive link arm, wherein rotational force applied to the drive link cuff about the shaft causes movement of the drive link arm.

8. The system of claim 7, further comprising:

a primary actuator configured to apply linear force to the primary link arm; and a secondary actuator configured to apply linear force the secondary link arm.

9. The system of claim 8, wherein the primary actuator and the secondary actuator comprise pneumatic cylinders or hydraulic cylinders.

10. The system of claim 7, wherein the drive link arm actuates one or more mechanical linkages configured to lock wings of a spacecraft in a fixed position.

11. The system of claim 1, wherein:

the primary link cuff comprises a ring of castellations at a drive link cuff-facing end of the primary link cuff;

the drive link cuff comprises a ring of castellations at a primary link cuff-facing end of the drive link cuff; and the ring of castellations of the primary link cuff interlock with the ring of castellations of the drive link cuff when the primary link cuff and the drive link cuff are interlocked.

12. The system of claim 11, wherein the ring of castellations of the primary link cuff and the ring of castellations of the drive link cuff are asymmetrical.

13. A system comprising a primary link cuff;

a secondary link cuff comprising a tooth extending away from the primary link cuff along a shaft; and a drive link cuff comprising a raised shoulder at least partially encircling the shaft, wherein a secondary link cuff-facing surface of the raised shoulder of the drive link cuff comprises:

a ramp rising towards the primary link cuff along the shaft, and a slot, following in a first rotational direction, an end of the ramp closest to the primary link cuff, wherein the slot recesses inwards away from the primary link cuff along the shaft;

wherein the primary link cuff, the secondary link cuff, and the drive link cuff are arranged along the shaft with the secondary link cuff positioned between the primary link cuff and the drive link cuff such that when the drive link cuff is interlocked with the primary link cuff and non-interlocked with the secondary link cuff:

rotation of the secondary link cuff about the shaft in the first rotational direction causes a distal end of the tooth of the secondary link cuff to slide up the ramp of the drive link cuff causing the secondary link cuff to push the primary link cuff along the shaft away from the drive link cuff to un-interlock the primary link cuff from the drive link cuff, and further rotation of the secondary link cuff about the shaft in the first rotational direction causes the distal end of the tooth to slide into the slot of the drive link cuff, thereby interlocking the secondary link cuff with the drive link cuff.

14. The system of claim 13, wherein:

rotational force applied by the primary link cuff to the drive link cuff causes the drive link cuff to rotate about the shaft when the drive link cuff is interlocked with the primary link cuff and non-interlocked with the secondary link cuff; and rotational force applied by the secondary link cuff to the drive link cuff causes the drive link cuff to rotate about the shaft when the drive link cuff is interlocked with the secondary link cuff and non-interlocked with the primary link cuff.

15. The system of claim 13, further comprising a compressible mechanical device arranged along the shaft, wherein:

the primary link cuff is positioned between the compressible mechanical device and the secondary link cuff along the shaft;

the compressible mechanical device applies linear force to the primary link cuff and the secondary link cuff towards the drive link cuff; and the linear force applied by the compressible mechanical device on the primary link cuff and the secondary link cuff towards the drive link cuff, in combination with the further rotation of the secondary link cuff about the shaft in the first rotational direction, causes the distal end of the tooth of the secondary link cuff to slide into the slot of the drive link cuff.

16. The system of claim 13, wherein:

the primary link cuff comprises a raised shoulder at least partially encircling the shaft;

when the distal end of the tooth of the secondary link cuff slides up the ramp of the raised shoulder of the drive link cuff, the secondary link cuff linearly articulates along the shaft towards the primary link cuff; and the linear articulation of the secondary link cuff along the shaft towards the primary link cuff causes a primary link cuff-facing surface of the secondary link cuff to push a secondary link cuff-facing surface of the raised shoulder of the primary link cuff away from the drive link cuff, thereby un-interlocking the primary link cuff from the drive link cuff.

17. The system of claim 13, further comprising:

a primary link comprising a primary link arm and the primary link cuff at a distal end of the primary link arm, wherein linear force applied to the primary link arm causes rotation of the primary link cuff about the shaft;

a secondary link comprising a secondary link arm and the secondary link cuff at a distal end of the secondary link arm, wherein linear force applied to the secondary link arm causes rotation of the secondary link cuff about the shaft; and a drive link comprising a drive link arm and the drive link cuff at a distal end of the drive link arm, wherein rotational force applied to the drive link cuff about the shaft causes movement of the drive link arm.

18. The system of claim 17, further comprising:

a primary actuator configured to apply linear force to the primary link arm; and a secondary actuator configured to apply linear force the secondary link arm.

19. The system of claim 17, wherein the drive link arm actuates one or more mechanical linkages configured to lock wings of a spacecraft in a fixed position.

20. A system comprising:

a primary link cuff;

a secondary link cuff comprising a tooth extending away from the primary link cuff along a shaft;

a drive link cuff comprising a raised shoulder at least partially encircling the shaft, wherein a secondary link cuff-facing surface of the raised shoulder of the drive link cuff comprises:

a ramp rising towards the primary link cuff along the shaft, and a slot, following in a first rotational direction, an end of the ramp closest to the primary link cuff, wherein the slot recesses inwards away from the primary link cuff along the shaft; and a mechanical device that applies linear force to the primary link cuff and the secondary link cuff towards the drive link cuff;

wherein the mechanical device, the primary link cuff, the secondary link cuff, and the drive link cuff are arranged along the shaft with the primary link cuff positioned between the mechanical device and the secondary link cuff, and the secondary link cuff positioned between the primary link cuff and the drive link cuff such that:

rotational force applied by the primary link cuff to the drive link cuff causes the drive link cuff to rotate about the shaft when the drive link cuff is interlocked with the primary link cuff and non-interlocked with the secondary link cuff, rotational force applied by the secondary link cuff to the drive link cuff causes the drive link cuff to rotate about the shaft when the drive link cuff is interlocked with the secondary link cuff and non-interlocked with the primary link cuff, and when the drive link cuff is interlocked with the primary link cuff and non-interlocked with the secondary link cuff:

rotation of the secondary link cuff about the shaft in the first rotational direction causes a distal end of the tooth of the secondary link cuff to slide up the ramp of the drive link cuff causing the secondary link cuff to push the primary link cuff along the shaft away from the drive link cuff to un-interlock the primary link cuff from the drive link cuff, and further rotation of the secondary link cuff about the shaft in the first rotational direction, in combination with the linear force applied by the mechanical device, causes the distal end of the tooth to slide into the slot of the drive link cuff, thereby interlocking the secondary link cuff with the drive link cuff.

* * * * *